(12) United States Patent
Gresset et al.

(10) Patent No.: US 8,750,403 B2
(45) Date of Patent: Jun. 10, 2014

(54) METHOD FOR LIMITING INTERFERENCE RECEIVED BY A PLURALITY OF DESTINATIONS

(75) Inventors: Nicolas Gresset, Rennes Cedex 7 (FR); Melanie Plainchault, Rennes Cedex 7 (FR)

(73) Assignee: Mitsubishi Electric Corporation, Tokyo (JP)

(*) Notice: Subject to any disclaimer, the term of this patent is extended or adjusted under 35 U.S.C. 154(b) by 359 days.

(21) Appl. No.: 13/225,886

(22) Filed: Sep. 6, 2011

(65) Prior Publication Data

US 2012/0076243 A1 Mar. 29, 2012

(30) Foreign Application Priority Data

Sep. 24, 2010 (EP) .................. 10179155

(51) Int. Cl.
*H04B 7/15* (2006.01)
(52) U.S. Cl.
USPC ........................................ 375/267; 455/11.1
(58) Field of Classification Search
CPC .... H04B 7/026; H04B 7/155; H04B 7/15592; H04L 25/20; H04L 2001/0097
USPC .......... 375/260, 267, 285, 296; 455/7, 9, 11.1
See application file for complete search history.

(56) References Cited

U.S. PATENT DOCUMENTS

| 2008/0049658 | A1 | 2/2008 | Asai et al. | |
| 2010/0062708 | A1 | 3/2010 | Sangiamwong et al. | |
| 2012/0020279 | A1* | 1/2012 | Kim et al. | 370/315 |

FOREIGN PATENT DOCUMENTS

| EP | 1 895 702 A2 | 3/2008 |
| EP | 2 161 853 A2 | 3/2010 |
| WO | WO 2010/060490 A1 | 6/2010 |
| WO | WO 2010/064867 A2 | 6/2010 |

OTHER PUBLICATIONS

Extended European Search Report issued May 6, 2011, in European 10179155.6, filed Sep. 24, 2010.
U.S. Appl. No. 13/983,943, filed Aug. 6, 2013, Plainchault, et al.

* cited by examiner

*Primary Examiner* — David B. Lugo
(74) *Attorney, Agent, or Firm* — Oblon, Spivak, McClelland, Maier & Neustadt, L.L.P.

(57) ABSTRACT

The present invention concerns a method for limiting interference received by a plurality of destinations, the interference being generated by plural flows of complex modulation symbols transferred by a plurality of sources on same resources of a wireless telecommunication network. The method comprises the steps executed by a relay of:

receiving complex modulation symbols, decoding complex modulation symbols and successfully retrieving an information word from which the complex modulation symbols are derived, generating complex modulation symbols that will be transmitted by the source, pre-coding the generated complex modulation symbols by a pre-coding matrix, the pre-coding matrix being defined so as to reduce the interference generated by the flow of complex modulation symbols on the other flows of complex modulation symbols, transferring the pre-coded complex modulation symbols.

9 Claims, 8 Drawing Sheets

METHOD FOR LIMITING INTERFERENCE RECEIVED BY A PLURALITY OF DESTINATIONS

The present invention relates generally to a method and a device for limiting interference received by a plurality of destinations, the interference being generated by plural flows of complex modulation symbols.

When several sources want to transmit data to a single destination, for example the uplink of a cellular system, or when multi source-destination pairs are transmitting on the same physical resource, interference occurs.

Interference degrades the quality of signals received by the destination or destinations.

The present invention aims at limiting interference received by a plurality of destinations, wherein the interferences are generated by plural flows of complex modulation symbols.

To that end, the present invention concerns a method for limiting interference received by a plurality of destinations, the interference being generated by plural flows of complex modulation symbols transferred by a plurality of sources on same resources of a wireless telecommunication network, each source transferring a flow of complex modulation symbols to one destination, characterised in that the method comprises the steps executed by a relay for each flow of complex modulation symbols, of:
  receiving complex modulation symbols,
    decoding complex modulation symbols of the flow of complex modulation symbols and successfully retrieving an information word from which the complex modulation symbols are derived,
  generating complex modulation symbols that will be transmitted by the source which transmits the flow of complex modulation symbols derived from the information word,
  pre-coding the generated complex modulation symbols that will be transmitted by the source which transmits the flow of complex modulation symbols derived from the information word, by a pre-coding matrix, the pre-coding matrix being defined so as to reduce the interference generated by the flow of complex modulation symbols on the other flows of complex modulation symbols,
  transferring the pre-coded complex modulation symbols at the same time as the complex modulation symbols transmitted by the source which transmits the flow of complex modulation symbols derived from the information word.

The present invention concerns also a device for limiting interference received by a plurality of destinations, the interference being generated by plural flows of complex modulation symbols transferred by a plurality of sources on same resources of a wireless telecommunication network, each source transferring a flow of complex modulation symbols to one destination, characterised in that the device for limiting interference is included in a relay and comprises for each flow of complex modulation symbols:
  means for receiving complex modulation symbols,
    means for decoding complex modulation symbols of the flow of complex modulation symbols and for successfully retrieving an information word from which the complex modulation symbols are derived,
  means for generating complex modulation symbols that will be transmitted by the source which transmits the flow of complex modulation symbols derived from the information word,
  means for pre-coding the generated complex modulation symbols that will be transmitted by the source which transmits the flow of complex modulation symbols derived from the information word, by a pre-coding matrix, the pre-coding matrix being defined so as to reduce the interference generated by the flow of complex modulation symbols on the other flows of complex modulation symbols,
  means for transferring the pre-coded complex modulation symbols at the same time as the complex modulation symbols transmitted by the source which transmits the flow of complex modulation symbols derived from the information word.

Thus, the quality of the data link between a source and a destination is helped by the use of a relay.

According to a particular feature, the pre-coding matrix is determined according to a matrix of channel coefficients between the sources and the destinations and to a matrix between the relay and the destinations.

Thus, the signal transmitted by the relay is adapted to the current channel seen by the destination, and the interference limitation is more efficient.

According to a particular feature, prior to pre-code the generated complex modulation symbols that will be transmitted by the source which transmits the flow of complex modulation symbols derived from the information word, the relay;
  checks if at least one complex modulation symbol transmitted by the source prior to the successful retrieving of the information word has not been transferred by the relay and if at least one complex modulation symbol transmitted by the source prior to the successful retrieving of the information word has not been transferred by the relay:
  generates complex modulation symbols transmitted by the source prior the successful retrieving of the information word,
  generates complex modulation symbols that will be transmitted by the source which transmits the flow of complex modulation symbols derived from the information word,
  combines the generated complex modulation symbols,
    pre-codes the combined complex modulation symbols by the pre-coding matrix,
  transfers the pre-coded combined complex modulation symbols at the same time as the complex modulation symbols transmitted by the source which transmits the flow of complex modulation symbols derived from the information word.

Thus, by transmitting the same symbols as the source through the pre-coder, the relay limits the interference on the other flows of complex modulation symbols.

By transferring at the same time past symbols, the interference limitation can also be applied on symbols previously sent by the source, by using an appropriate combination technique at the destination.

According to a particular feature, the relay updates the modulation used for transferring the pre-coded combined complex modulation symbols.

Thus, the according receiver technique at the destination may be of low complexity.

According to a particular feature, the generated complex modulation symbols are weighted by coefficients during the combining step and the coefficients are chosen such that combined generated complex modulation symbols belong to a Quadrature amplitude modulation.

Thus, the decoder complexity remains limited.

According to a particular feature, the relay is a half duplex relay and the relay, prior to generating and to transmitting complex modulation symbols, checks if at least two information words from which complex modulation symbols of at least two different flows of complex modulation symbols are successfully retrieved, the complex modulation symbol generation and transfer being executed only if at least two information words from which complex modulation symbols of at least two different flows of complex modulation symbols are successfully retrieved.

Thus, the half duplex relay can help in reducing the interference generated by several flows of complex modulation symbols transferred on the same time resource.

The present invention concerns also a method for limiting interference received by a plurality of destinations, the interference being generated by plural flows of complex modulation symbols transferred by a plurality of sources on the same resource of a wireless telecommunication network, each source transferring a flow of complex modulation symbols to one destination, characterised in that the method comprises the steps executed for each flow of complex modulation symbols, of:

receiving complex modulation symbols,
   decoding complex modulation symbols of the flow of complex modulation symbols and successfully retrieving an information word from which the complex modulation symbols are derived,
   generating complex modulation symbols that will be transmitted by the source which transmits the flow of complex modulation symbols derived from the information word,
   pre-coding the generated complex modulation symbols that will be transmitted by the source which transmits the flow of complex modulation symbols derived from the information word, by a pre-coding matrix, the pre-coding matrix being defined so as to reduce the interference generated by the flow of complex modulation symbols on the other flows of complex modulation symbols,
   transferring the pre-coded complex modulation symbols at the same time as the complex modulation symbols transmitted by the source which transmits the flow of complex modulation symbols derived from the information word.
receiving by the destination the complex modulation symbols from the source and the relay.

The present invention also concerns a system for limiting interference received by a plurality of destinations, the interference being generated by plural flows of complex modulation symbols transferred by a plurality of sources on same resources of a wireless telecommunication network, each source transmitting a flow of complex modulation symbols to one destination, characterised in that the system comprises:
   means for receiving complex modulation symbols,
      means for decoding complex modulation symbols of the flow of complex modulation symbols and for successfully retrieving an information word from which the complex modulation symbols are derived,
   means for generating complex modulation symbols that will be transmitted by the source which transmits the flow of complex modulation symbols derived from the information word,
   means for pre-coding the generated complex modulation symbols that will be transmitted by the source which transmits the flow of complex modulation symbols derived from the information word, by a pre-coding matrix, the pre-coding matrix being defined so as to reduce the interference generated by the flow of complex modulation symbols on the other flows of complex modulation symbols,
   means for transferring the pre-coded complex modulation symbols at the same time as the complex modulation symbols transmitted by the source which transmits the flow of complex modulation symbols derived from the information word,
   means for receiving at the destination the complex modulation symbols transferred by the source and by the relay.

Thus, the quality of the data link between a source and a destination is helped by the use of a relay.

According to still another aspect, the present invention concerns a computer program which can be directly loadable into a programmable device, comprising instructions or portions of code for implementing the steps of the method according to the invention, when said computer program is executed on a programmable device.

Since the features and advantages relating to the computer programs are the same as those set out above related to the method and device according to the invention, they will not be repeated here.

The characteristics of the invention will emerge more clearly from a reading of the following description of an example of embodiment, the said description being produced with reference to the accompanying drawings, among which:

Figure 3:
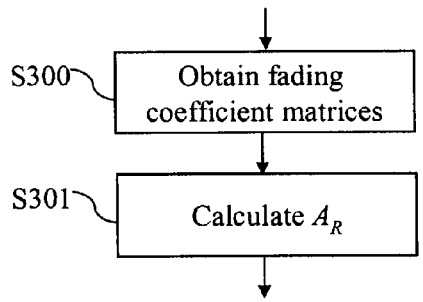
Figure 4:
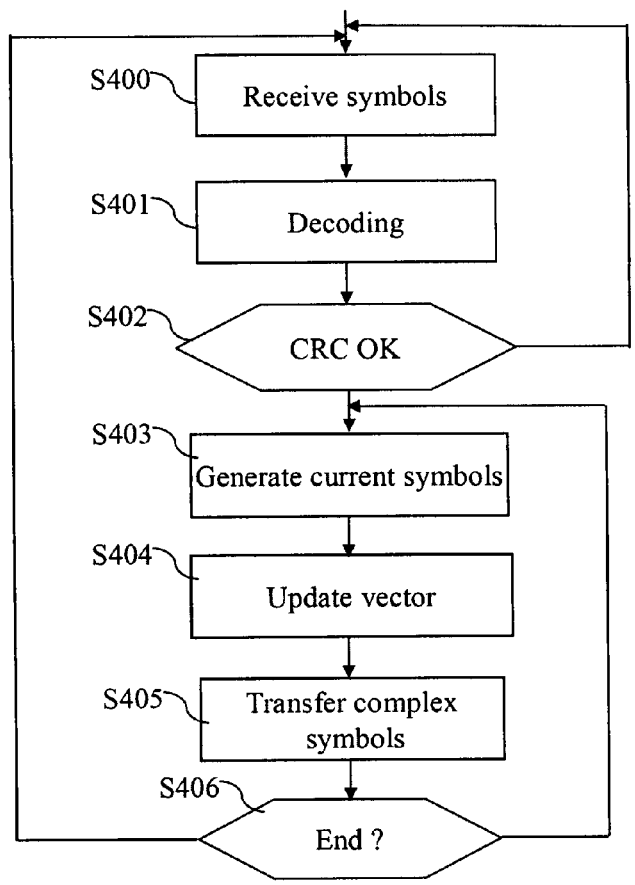
Figure 5:
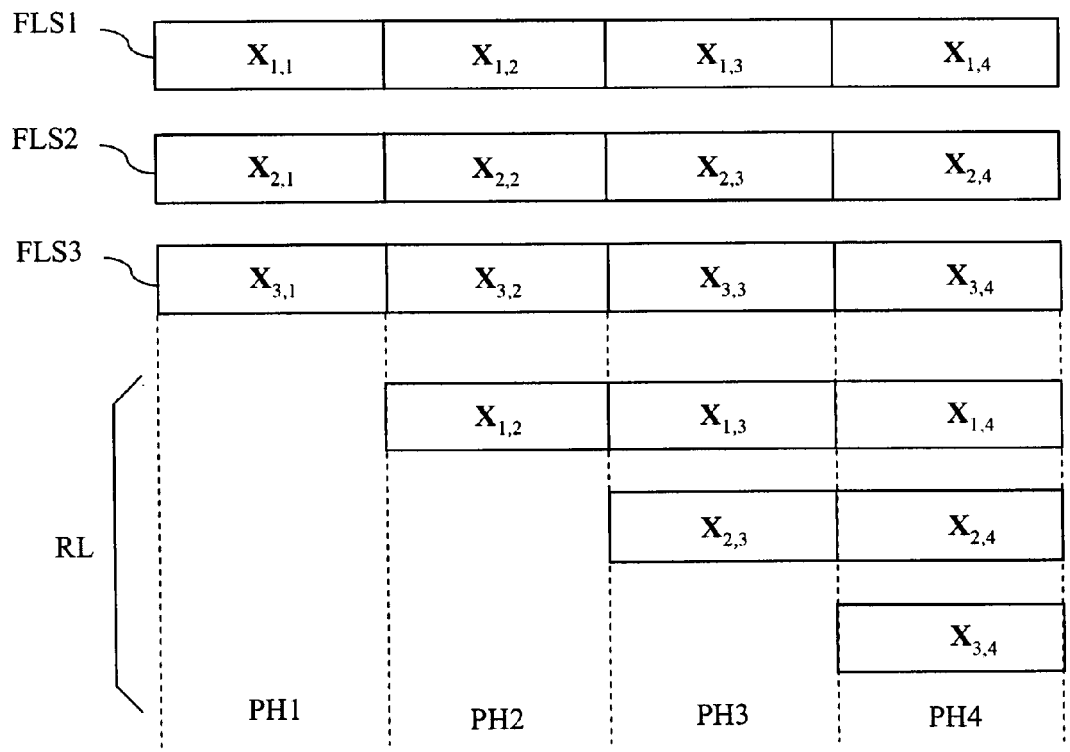
Figure 7:
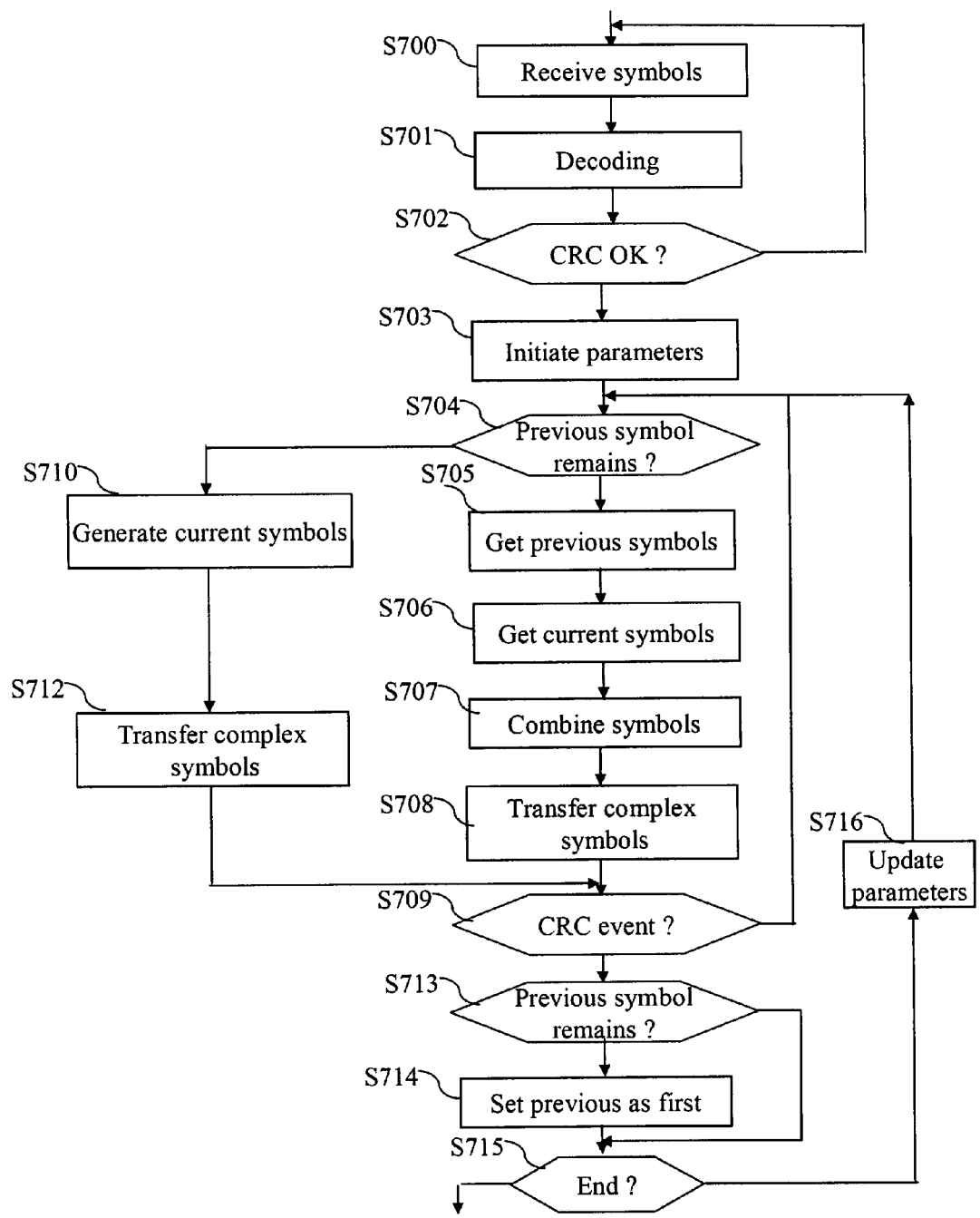
Figure 8:
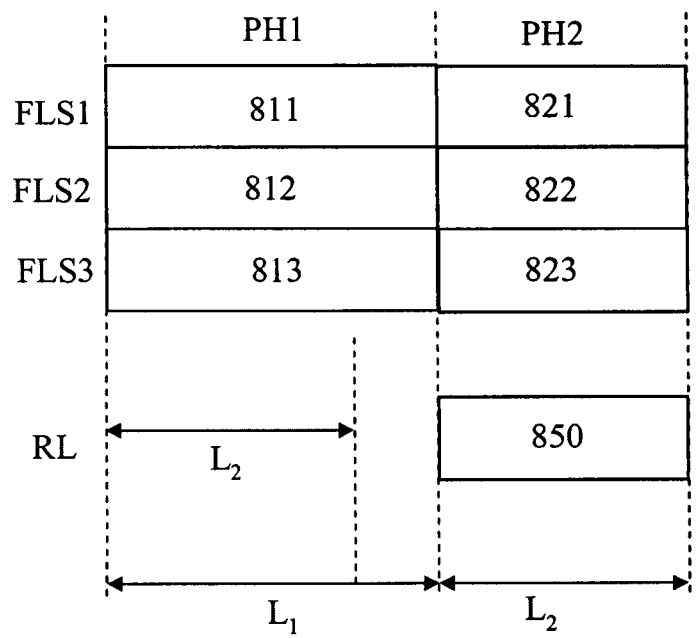
Figure 9:
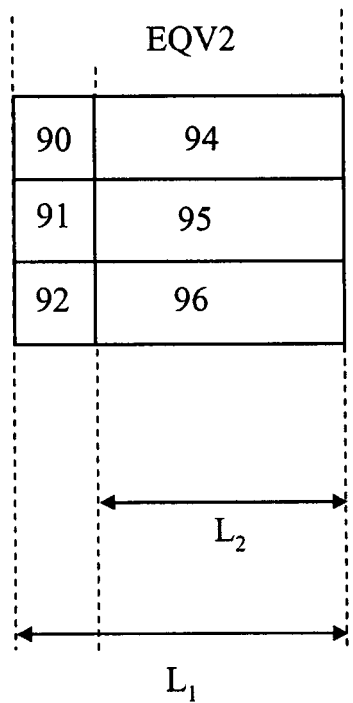
Figure 10:
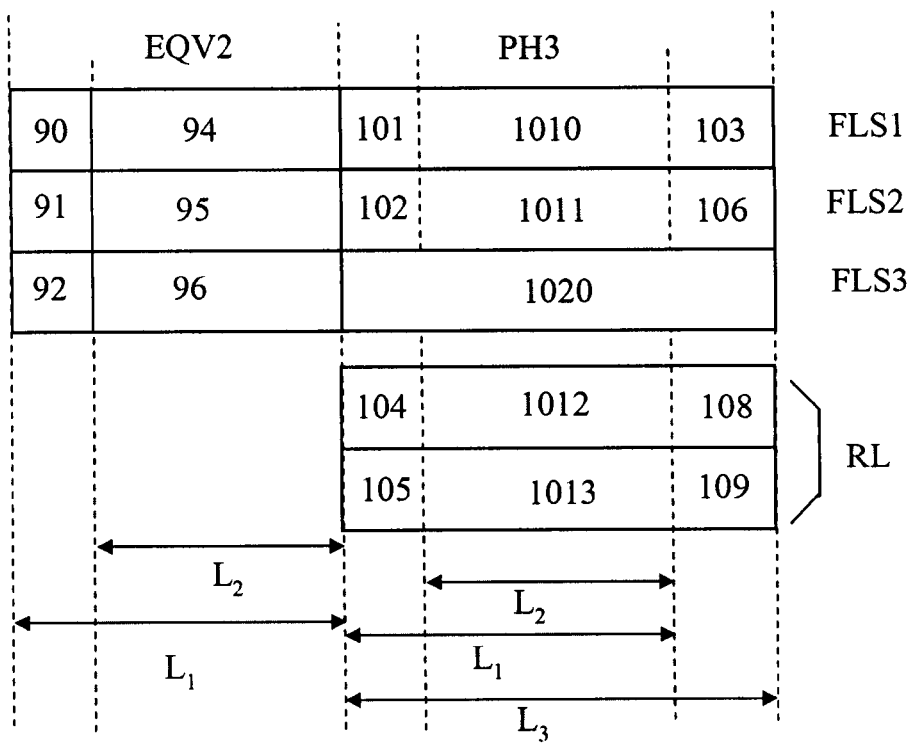
Figure 11:
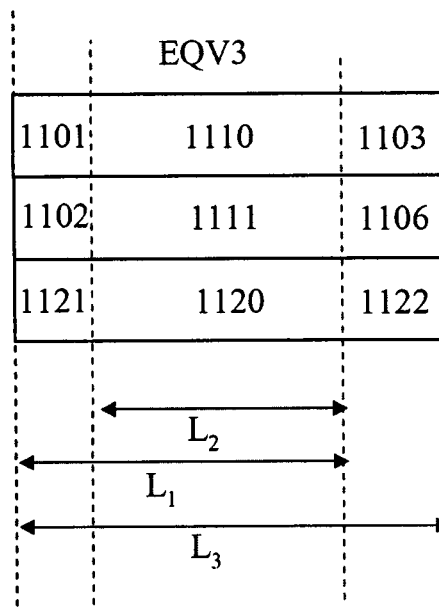

FIG. 3 discloses an example of an algorithm executed by the relay for determining a pre-coding matrix according to the present invention;

FIG. 4 discloses an example of an algorithm executed by the relay according to a first mode of realisation of the present invention;

FIG. 5 is an example of complex modulation symbols transferred with a dynamic decode and forward protocol according to the present invention;

FIGS. 6a to 6d are diagrams representing the evolution of interference neutralization at different phases according to the present invention;

FIG. 7 discloses an example of an algorithm executed by the relay according to a second mode of realisation of the present invention;

FIG. 8 represents the flow of vectors of complex modulation symbols transferred by the sources and the relay during phases PH1 and PH2;

FIG. 9 represents the equivalent channel at destination during the phase PH2;

FIG. 10 represents the equivalent channel at destination during the phase PH2 and the flow of vectors of complex modulation symbols transferred by the sources and the relay during phases PH3;

FIG. 11 represents the equivalent channel at destination during the phase PH3.

Figure 1:
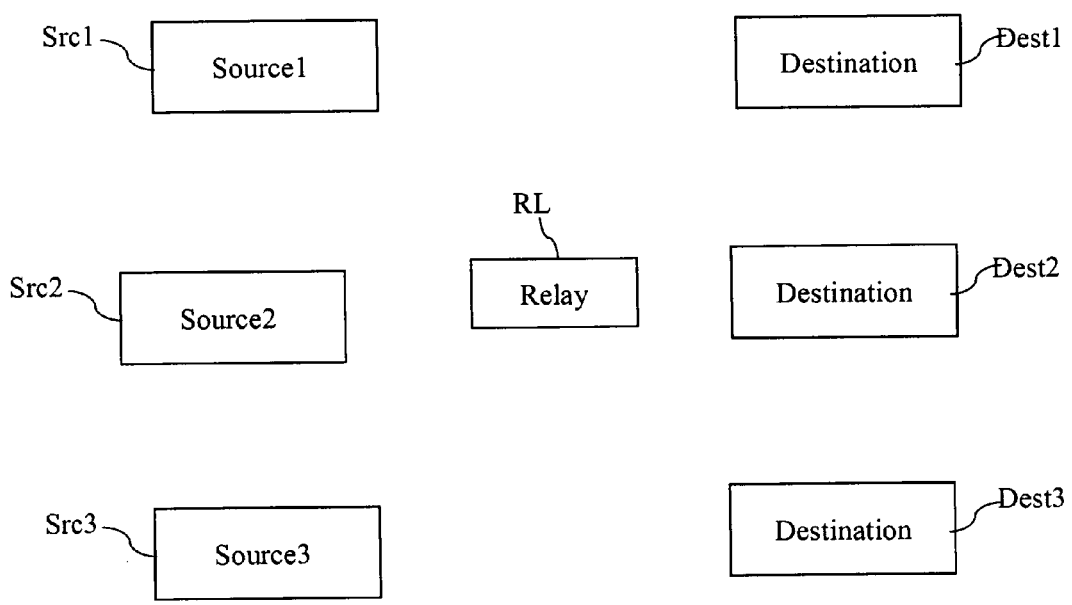
FIG. 1 represents the architecture of a wireless telecommunication network in which the present invention is implemented.

FIG. 1 represents the architecture of a wireless telecommunication network in which the present invention is implemented.

In the wireless telecommunication network, a plurality of sources Src1 to Src3 transmit information words in form of signals to a plurality of destinations Dest1 to Dest3.

The wireless telecommunication network may be a local area network or a wireless cellular telecommunication network.

The sources Src may be base stations which transmit signals to at least one destination like a mobile terminal or to a home base station.

The sources Src may be a mobile terminal or a home base station which transmit signals to a plurality of destinations like base stations.

The base stations are also named access nodes or node B or an enhanced node B.

The base stations or the home base stations may handle at least one mobile terminal.

A base station handles a mobile terminal when the base station has the necessary information for enabling the mobile terminal to establish a communication with a remote device through the base station.

The base station transmits signals to the mobile terminal through a downlink channel and receives signals transmitted by the mobile terminal through an uplink channel.

The sources Src1 to Src3 transfer different flows of complex modulation symbols.

It has to be noted here that the sources Src1 to Src3 are shown as separated devices in FIG. 1. The present invention is also applicable when the sources Src1 to Src3 are included in a same device, for example a device which performs beamforming in order to transfer three distinct flows of complex modulation symbols.

The destinations Dest1 to Dest3 are shown as separated devices in FIG. 1. The present invention is also applicable when the destinations Dest1 to Dest3 are included in a same device, for example a device which has plural antennas and decodes independently three distinct flows of vectors of complex modulation symbols. This is for example the case in the uplink channel of wireless cellular telecommunication networks where several mobile terminals communicate with a base station on the same resource. That scheme is known as uplink multi-user MIMO (Multiple Input Multiple Output).

The Source Src1 transfers one information word or plural information words through a flow of vectors of complex modulation symbols to the destination Dest1.

The Source Src2 transmits one information word or plural information words through a flow of vectors of complex modulation symbols to the destination Dest2.

The Source Src3 transmits one information word or plural information words through a flow of vectors of complex modulation symbols to the destination Dest3.

As the flows of vectors of complex modulation symbols are transmitted on the same resource of the wireless telecommunication network, the flow of vectors of complex modulation symbols transmitted by the source Src1 to the destination Dest1 interferes on the flow of vectors of complex modulation symbols transmitted by the source Src2 to the destination Dest2 and on the flow of vectors of complex modulation symbols transmitted by the source Src3 to the destination Dest3. The flow of vectors of complex modulation symbols transmitted by the source Src2 to the destination Dest2 interferes on the flow of vectors of complex modulation symbols transmitted by the source Src1 to the destination Dest1 and on the flow of vectors of complex modulation symbols transmitted by the source Src3 to the destination Dest3. The flow of vectors of complex modulation symbols transmitted by the source Src3 to the destination Dest3 interferes on the flow of vectors of complex modulation symbols transmitted by the source Src2 to the destination Dest2 and on the flow of vectors of complex modulation symbols transmitted by the source Src1 to the destination Dest1.

The source Srci, where i denotes the source index, transmits Ki information bits of an information word which are encoded by an encoder, output of which is interleaved to produce a vector of coded bits.

The vector of coded bits is given to the discrete modulation input which may be a Quadrature Phase Shift Keying modulation or a 16 or 64 Quadrature Amplitude Modulation in order to obtain complex modulation symbols.

The complex modulation symbols are derived from the information word.

Each source Srci may use the same modulation scheme as the other sources or may use a modulation scheme which is different from the one used by at least one of the other sources.

The complex modulation symbols are grouped into vectors of complex modulation symbols.

Each information word comprises redundancy check bits generated from a CRC.

Each vector of complex modulation symbols is sent over several time periods through the channel by means of virtual antennas which are composed of the concatenation of a precoding scheme that applies a transformation of the complex modulation symbols before mapping to the physical transmit antennas.

Encoding and interleaving is done more generally by a rate matching algorithm, such as the one used in the 3GPP-LTE standard (Third Generation Partnership Project-Long Term Evolution), that allows to generate any size of vector of coded bits from the information words, or in other words any possible coding rate. The generation of the coded bits can also be done in several steps, according to the vectors of complex modulation symbols transmission.

In the wireless cellular telecommunication network, a Hybrid-ARQ (HARQ) feedback scheme is provided from the destination Dest to the source Src in order to acknowledge or not the success of former vectors of complex modulation symbols transmissions.

In Hybrid-ARQ, a retransmission of additional redundancy is executed when the destination Dest is not able to successfully retrieve information word from which complex modulation symbols are derived, i.e. when the Cyclic redundancy check embedded in the sent information word fails.

As soon as sufficient redundancy is received, the destination Dest can decode the information word correctly, detects the correct decoding thanks to the CRC bits embedded in the information word, sends an acknowledgement message to the source, and the transmission of the information word and additional redundancy is stopped.

The destination Dest stores the concatenation of vectors of complex modulation symbols or of soft estimates of the coded bits received from the beginning of one information word transmission and applies a joint decoding on the concatenated vectors.

An acknowledgment is performed after a vector of complex modulation symbols reception and decoding if the CRC check for the vector of complex modulation symbols is correct.

Usually, each new vector of complex modulation symbols comprises additional redundancy taken from the output of the rate matching algorithm and of the error correcting code.

The relay RL may be a full duplex or a half duplex device. The relay RL may be comprised in a device like a base station, a home base station or a mobile terminal.

According to the invention, for each flow of complex modulation symbols, the relay RL:
  receives complex modulation symbols,
    decodes complex modulation symbols of the flow of complex modulation symbols and successfully retrieves an information word from which the complex modulation symbols are derived, generates complex modulation symbols that will be transmitted by the source which transmits the flow of complex modulation symbols derived from the information word, pre-codes the generated complex modulation symbols that will be transmitted by the source which transmits the flow of complex modulation symbols derived from the information word, by a pre-coding matrix, the pre-coding matrix being defined so as to reduce the interference generated by the flow of complex modulation symbols on the other flows of complex modulation symbols, transfers the pre-coded complex modulation symbols at the same time as the complex modulation symbols transmitted by the source which transmits the flow of complex modulation symbols derived from the information word.

The destination to which the flow of complex modulation symbols is transferred receives the complex modulation symbols from the source and the relay.

Figure 2:
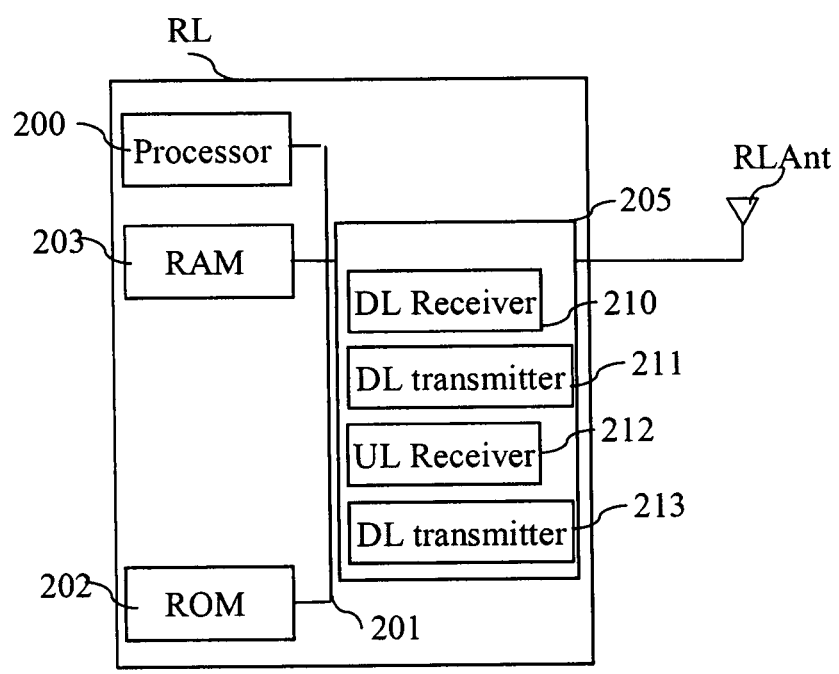
FIG. 2 is a diagram representing the architecture of a relay in which the present invention is implemented.

FIG. 2 is a diagram representing the architecture of a relay in which the present invention is implemented.

The relay RL has, for example, an architecture based on components connected together by a bus 201 and a processor 200 controlled by the program as disclosed in the FIGS. 3 and 4 or 7.

The bus 201 links the processor 200 to a read only memory ROM 202, a random access memory RAM 203 and a wireless interface 205.

The memory 203 contains registers intended to receive variables and the instructions of the programs as disclosed in the FIGS. 3 and 4 or 7.

The processor 200 controls the operation of the wireless interface 205.

The read only memory 202 contains instructions of the programs as disclosed in the FIGS. 3 and 4 or 7 which are transferred, when the relay RL is powered on, to the random access memory 203.

The wireless interface 205 enables the relay RL to transfer and/or receive signals or messages to/from a base station or a home base station and to/from at least one mobile terminal.

The wireless interface 205 is connected to an array of antennas RLAnt.

The wireless interface 205 may comprise a downlink reception module 210 which receives signals transferred by at least one base station or by a home base station, may comprise a downlink transmission module 211 which transfers signals to at least one mobile terminal or to a home base station, may comprise an uplink reception module 212 which receives signals transmitted by at least one mobile terminal or by a home base station and may comprise an uplink transmission module 213 which transfers signals to at least one base station or to a home base station.

The relay RL operates according to a Dynamic Decode and Forward (DDF) protocol.

DDF protocol includes a smart processing at the relay RL. The relay RL receives and tries to decode the information word transmitted from the source Src to the destination Dest and shifts to a transfer phase as soon as the information word from which the complex modulation symbols are derived is successfully retrieved.

FIG. 3 discloses an example of an algorithm executed by the relay for determining a pre-coding matrix according to the present invention.

More precisely, the present algorithm is executed by the processor 200 of the relay RL.

The present algorithm is executed periodically or each time channel conditions between the sources and destinations vary.

At step S300, the processor 200 obtains the channel coefficients between the sources Src1 to Src3 and the destinations Dest1 to Dest3 in order to form a source destination channel matrix $H_{SD}$. That can practically be made using a feedback link between the or each destination Dest and the sources Src.

At the same step, the processor 200 obtains the channel coefficients between the relay RL and the destinations Dest1 to Dest3 in order to form a relay destination channel matrix $H_{RD}$.

At next step S301 the processor 200 calculates a pre-coding matrix $A_R$ which is determined so as to cancel or limit the effect of interferences between the different flows of vectors of complex modulation symbols transmitted by the sources Src1 to Src3.

For example, N sources Src are transmitting N flows of vectors of complex modulation symbols, at least N reception antennas are receiving the N flows of vectors of complex modulation symbols. The N reception antennas are the one of one destination Dest or of N destinations carrying a single antenna. The relay RL is for example a full duplex relay carrying at least N antennas forming the array of antennas RLAnt.

We denote $H_{SD}$ the matrix of channel coefficients between the sources Src and the reception antennas of the destinations Dest, $H_{RD}$ the matrix of channel coefficients between the relay RL and the reception antennas of the destinations Dest. We assume that the channels are quasi-static.

The pre-coding matrix $A_R$ is determined according to the matrix $H_{SD}$ of channel coefficients between the sources and the reception antennas of the destinations Dest and to the matrix $H_{RD}$ of channel coefficients between the relay RL and the reception antennas of the destinations Dest.

In order to illustrate the concept of interference neutralization, let us consider a phase of the transmission in which the relay RL has successfully retrieved each information word from which complex modulation symbols of each flow of complex modulation symbols are derived and can generate new vectors of complex modulation symbols derived from each information word.

The complex modulation symbols transmitted by the source Srci in the t-th time slot of this phase are denoted $X_{i,N+1,t}$ and the complex modulation symbols transmitted by the relay RS for the source Srci in this phase are denoted $Z_{i,N+1,t}$.

Thus, considering all reception antennas, the received signals during this phase are:

$$Y_{N+1,t} = H_{SD}\begin{bmatrix} X_{1,N+1,t} \\ \vdots \\ X_{i,N+1,t} \\ \vdots \\ X_{N,N+1,t} \end{bmatrix} + H_{RD}A_R\begin{bmatrix} Z_{1,N+1,t} \\ \vdots \\ Z_{i,N+1,t} \\ \vdots \\ Z_{N,N+1,t} \end{bmatrix} + \eta_{N+1,t}$$

It has to be noted here that each symbol $Z_{i,N+1,t}$ is pre-coded by a vector of the pre-coding matrix $A_R$.

For example, the relay RL can generate the same complex modulation symbol as those transmitted by the source Srci, i.e., $Z_{i,N+1,t} = X_{i,N+1,t}$. In that case, we obtain:

$$Y_{N+1,t} = (H_{SD} + H_{RD}A_R)\begin{bmatrix} X_{1,N+1,t} \\ \vdots \\ X_{i,N+1,t} \\ \vdots \\ X_{N,N+1,t} \end{bmatrix} + \eta_{N+1,t}$$

where $\eta_{N+1,t}$ is a vector of complex white Gaussian noise.

The destination Desti observes an equivalent channel $H_{SD} + H_{RD}A_R$.

For the interference to be neutralized, the pre-coding matrix $A_R$ must satisfy that there exists a diagonal matrix D so that:

$$H_{SD}++H_{RD}A_R=D$$

The diagonal coefficients in the diagonal matrix D are available degrees of freedom for the relay RL to improve the useful signal received at the destination Desti by maximizing the resulting signal interference plus noise ratio SINR.

Because the channel coefficients are considered to be quasi static, the pre-coding matrix $A_R$ is considered as remaining the same for the whole transmission of the N flows of vectors of complex modulation symbols.

In case the channel coefficients are changing, the pre-coding matrix $A_R$ is modified accordingly.

Even if the relay RL only correctly decodes a subset of flows of vectors of complex modulation symbols, the relay RL can use the interference neutralization where the relay RL generates the same symbols as the sources to remove part of the interference suffered at the reception antennas.

Thus, after phase PHk, where k denotes the index of phase PH, assuming that the relay RL has successfully retrieved the k information words from which the complex modulation symbols of the k first flows of vectors of complex modulation symbols sent by the source Srci are derived, where i equals 1 to k, it follows that the received signals at t-th time slot of the phase PHk+1 are:

$$Y_{k+1,t} = H_{SD}\begin{bmatrix} X_{1,k+1,t} \\ \vdots \\ X_{k,k+1,t} \\ \vdots \\ X_{N,k+1,t} \end{bmatrix} + H_{RD}A_R\begin{bmatrix} X_{1,k+1,t} \\ \vdots \\ X_{k,k+1,t} \\ 0 \\ 0 \end{bmatrix} + \eta_{k+1,t},$$

where k+1 is the index of phase PHk+1.

FIG. 4 discloses an example of an algorithm executed by the relay according to a first mode of realisation of the present invention.

The present algorithm is executed by the relay RL in parallel for each flow of vectors of complex modulation symbols.

More precisely, the present algorithm is executed by the processor 200 of the relay RL.

At step S400, the processor 200 detects the reception of a vector of complex modulation symbols through the wireless interface 205. The vector of complex modulation symbols belongs to the flow of vectors of complex modulation symbols for which the present algorithm is executed.

The vector of complex modulation symbols is received by the downlink receiver 210 or the uplink receiver 212 and is concatenated to the vectors of complex modulation symbols which have been previously received from the beginning of the transmission of one information word.

At next step S401, the processor 200 commands the wireless interface 205 to decode at least one received vector of complex modulation symbols.

The at least one received vector of complex modulation symbols includes the last received vector of complex modulation symbols and may include at least one vector of complex modulation symbols previously received by the relay RL.

The at least one vector of complex modulation symbols is demodulated, de-interleaved and decoded into soft estimates of information bits and redundancy.

At next step S402, the processor 200 checks if the cyclic redundancy check CRC determined after the decoding of the at least one decoded received vector of complex modulation symbols is correct.

If the CRC is correct, the information word from which the at least one complex modulation symbol is derived is successfully retrieved, the processor 200 moves to step S403, otherwise, the processor 200 returns to step S400.

It has to be noted here that in a variant, if the CRC is correct, the processor 200 further checks if an acknowledgment message has been transferred by the destination Dest to the source Src for the last received vector of complex modulation symbols.

If an acknowledgment message has been transferred, the processor 200 moves to step S406, otherwise, the processor 200 returns to step S400.

Once the CRC is correct, the processor 200 knows the Ki information bits transmitted by the source Srci and is able to generate vectors of complex modulation symbols in the same way as the source Srci, thanks to a rate matching algorithm and the knowledge of the information word.

FIG. 5 is an example of complex modulation symbols transferred with a dynamic decode and forward protocol according to the present invention.

In the example of FIG. 5, N equals three sources Src that are transmitting each one flow of vectors of complex modulation symbols.

In the first phase PH1, the relay RL receives a vector $X_{1,1}=[X_{1,1,1}, \ldots, X_{1,1,t}, \ldots]$ of complex modulation symbols of the flow FLS1 of vectors of complex modulation symbols, the relay RL receives a vector $X_{2,1}$ of complex modulation symbols of the flow FLS2 of vectors of complex modulation symbols and the relay RL receives a vector $X_{3,1}$ of complex modulation symbols of the flow FLS1 of vectors of complex modulation symbols.

At the end of phase PH1, the processor 200 decodes the vector $X_{1,1}$ of complex modulation symbols and successfully retrieves the information word from which complex modulation symbols of the flow of vectors complex modulation symbols FLS1 are derived.

At the end of phase PH1, the processor 200 decodes the vectors $X_{2,1}$ and $X_{3,1}$ of complex modulation symbols and does not successfully retrieves the information word from which complex modulation symbols of the flows of complex modulation symbols FLS2 and FLS3 are derived.

For the flow FLS1 of vectors of complex modulation symbols, the processor 200 moves from step S402 to S403.

For the flows FLS2 and FLS3 of vectors of complex modulation symbols, the processor 200 returns from step S402 to S400.

As the processor 200 knows the K1 information bits from which the vector $X_{1,1}$ of complex modulation symbols is derived, the processor 200 can then determine the corresponding redundancy and produce the interleaved coded bits thanks to the rate matching algorithm.

The vector of coded bits are then given to the discrete modulation input which produces complex modulation symbols.

The processor 200 is able to generate vectors of complex modulation symbols that will be transmitted by the source Src1 during phase PH2.

The vectors of complex modulation symbols corresponding to the flows FLS2 and FLS3 of vectors of complex modulation symbols of which information words have not been successfully retrieved are replaced by null values, i.e. the relay RL does not transmit signal corresponding to these flows of vectors of complex modulation symbols.

At step S403, the processor 200 generates a vector $X_{1,2}$ of complex modulation symbols that is transmitted by the source Src1 during next phase PH2.

At next step S404, the processor 200 replaces, in the second vector of above mentioned formula, null value by the decoded value of the vector $X_{1,2}$ of complex modulation symbols derived from the information word that has been successfully retrieved.

The signals received at the destinations will become during the t-th time slot of phase PH2:

$$Y_{2,t} = H_{SD} \begin{bmatrix} X_{1,2,t} \\ X_{2,2,t} \\ X_{3,2,t} \end{bmatrix} + H_{RD} A_R \begin{bmatrix} X_{1,2,t} \\ 0 \\ 0 \end{bmatrix} + \eta_{2,t}$$

In the second vector of above mentioned formula, i.e.

$$\begin{bmatrix} X_{1,2,t} \\ 0 \\ 0 \end{bmatrix}$$

null values correspond to complex modulation symbols derived from information words that have not been successfully retrieved and generated by the relay RL yet.

At next step S405, the processor 200 commands the transfer of the vector $X_{1,2}$ of complex modulation symbols and null symbols which are pre-coded by the pre-coding matrix $A_R$ through the wireless interface 205.

At the beginning of phase PH2 the vector of complex modulation symbols $X_{1,2}$ is transmitted.

More precisely, at each time slot of phase PH2, the complex modulation symbol $X_{1,2,t}$ pre-coded by the pre-coding matrix $A_R$ is transferred at step S405 at the same time as the complex modulation symbol $X_{1,2,t}$ transmitted by the source Src1.

The vector of complex modulation symbols $X_{1,2}$ transmitted by the source Src1 is transmitted at the same time as the vector of complex modulation symbols $X_{2,2}$ transmitted by the source Src2.

The vector of complex modulation symbols $X_{1,2}$ transmitted by the source Src1 is transmitted at the same time as the vector of complex modulation symbols $X_{3,2}$, transmitted by the source Src3 during phase PH2.

At next step S406, the processor 200 checks if the transmission of vectors of complex modulation symbols ends or if an acknowledgement is sent from the destination Dest to the source Src.

The transmission of complex modulation symbols ends when the destination Dest acknowledges one vector of complex modulation symbols or when no acknowledgment is received within a given time period or in case of broadcasting, when all vectors of complex modulation symbols are transmitted.

If the transmission of vectors of complex modulation symbols ends, the processor 200 returns to step S400. Otherwise, the processor 200 moves to step S403 already disclosed.

Once the transmission of vectors of complex modulation symbols ends, the processor 200 resets the buffer associated to the information word in the RAM memory 203.

At the end of phase PH2, the processor 200 successfully retrieves the information word from which the vector $X_{2,2}$ of complex modulation symbols is derived and does not successfully retrieve the information word from which the vector $X_{3,2}$ of complex modulation symbols is derived.

For the flow FLS2 of vectors of complex modulation symbols, the processor 200 moves from step S402 to S403.

For the flow FLS3 of vectors of complex modulation symbols, the processor 200 returns from step S402 to S400.

As the processor 200 knows the K2 information bits from which the vector $X_{2,2}$ of complex modulation symbols is derived, the processor 200 can then determine the corresponding redundancy and produce the interleaved coded bits thanks to the rate matching algorithm.

The vector of coded bits are then given to the discrete modulation input which produces complex modulation symbols.

The processor 200 is able to generate vectors of complex modulation symbols that will be transmitted by the sources Src1 and Src2 during phase PH3.

The processor 200 generates vectors $X_{1,3}$ and $X_{2,3}$ of complex modulation symbols that will be transmitted by the sources Src1 and Src2 during next phase PH3.

The signals received at the destinations will become during the t-th time slot of phase PH3:

$$Y_{3,t} = H_{SD} \begin{bmatrix} X_{1,3,t} \\ X_{2,3,t} \\ X_{3,3,t} \end{bmatrix} + H_{RD} A_R \begin{bmatrix} X_{1,3,t} \\ X_{2,3,t} \\ 0 \end{bmatrix} + \eta_{3,t}$$

The vectors of complex modulation symbols $X_{1,3}$ and $X_{2,3}$ which are pre-coded by the pre-coding matrix $A_R$ are transferred at the same time as the vector of complex modulation symbols $X_{1,3}$ transmitted by the source Src1, as the vector of complex modulation symbols $X_{2,3}$ transmitted by the source Src2 and as the vector of complex modulation symbols $X_{3,3}$ transmitted by the source Src3 during phase PH3.

At the end of phase PH3, the processor 200 successfully retrieves the information word from which the vector $X_{3,3}$ of complex modulation symbols is derived.

For the flow FLS3 of vectors of complex modulation symbols, the processor 200 moves from step S402 to S403.

As the processor 200 knows the K3 information bits from which the vector $X_{3,3}$ of complex modulation symbols is derived, the processor 200 can then determine the corresponding redundancy and produce the interleaved coded bits thanks to the rate matching algorithm.

The vector of coded bits are then given to the discrete modulation input which produces complex modulation symbols.

The processor 200 is able to generate vectors of complex modulation symbols that will be transmitted by the sources Src1, Src2 and Src3 during phase PH4.

The processor 200 generates vectors $X_{1,4}$, $X_{2,4}$ and $X_{3,4}$ of complex modulation symbols that will be transmitted by the sources Src1, Src2 and Src3 during next phase PH4.

The signals received at the destinations will become at phase PH4:

$$Y_{4,t} = H_{SD} \begin{bmatrix} X_{1,4,t} \\ X_{2,4,t} \\ X_{3,4,t} \end{bmatrix} + H_{RD} A_R \begin{bmatrix} X_{1,4,t} \\ X_{2,4,t} \\ X_{3,4,t} \end{bmatrix} + \eta_{4,t}$$

The vectors of complex modulation symbols $X_{1,4}$, $X_{2,4}$ and $X_{3,4}$ which are pre-coded by the pre-coding matrix $A_R$ are transferred at the same time as the vector of complex modulation symbols $X_{1,4}$ transmitted by the source Src1, as the vector of complex modulation symbols $X_{2,4}$ transmitted by the source Src2 and as the vector of complex modulation symbols $X_{3,4}$ transmitted by the source Src3 during phase PH4.

FIGS. 6a to 6d are diagrams representing the evolution of interference neutralization at different phases according to the present invention.

Figure 6A:
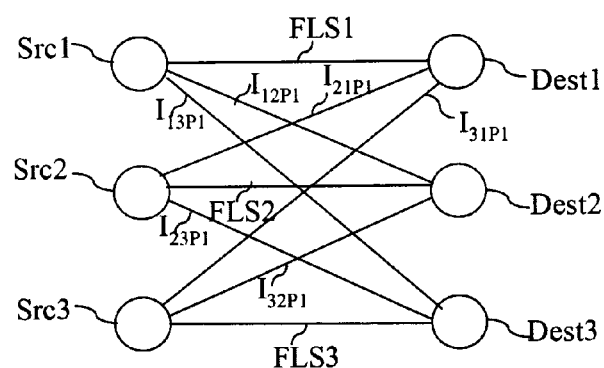

The diagram in FIG. 6a represents the interferences received by the destinations Dest during phase PH1.

The source Src1 transmits the flow FLS1 of vectors of complex modulation symbols to the destination Dest1. The flow FLS1 of vectors of complex modulation symbols generates interferences $I_{12P1}$ at destination Dest2 and generates interferences $I_{13P1}$ at destination Dest3.

The source Src2 transmits the flow FLS2 of vectors of complex modulation symbols to the destination Dest2. The flow FLS2 of vectors of complex modulation symbols generates interferences $I_{21P1}$ at destination Dest1 and generates interferences $I_{23P1}$, at destination Dest3.

The source Src3 transmits the flow FLS3 of vectors of complex modulation symbols to the destination Dest3. The flow FLS3 of vectors of complex modulation symbols generates interferences $I_{31P1}$, at destination Dest1 and generates interferences $I_{32P1}$ at destination Dest2.

Figure 6B:
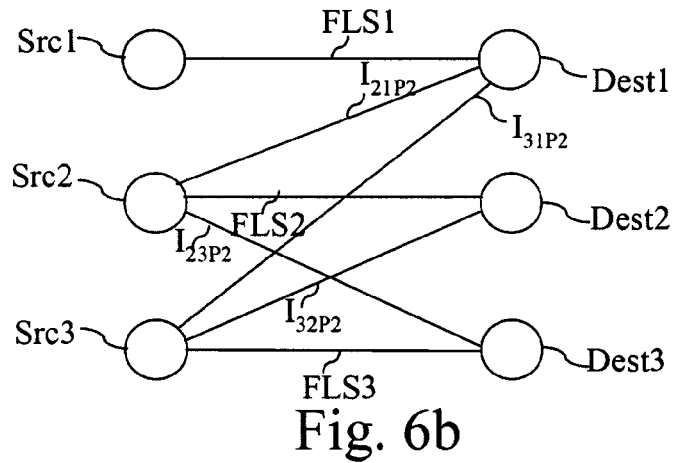

The diagram in FIG. 6b represents the interferences received by the destinations Dest during phase PH2.

The source Src1 transmits the flow FLS1 of vectors of complex modulation symbols to the destination Dest1. The relay RL transfers the same vector of complex modulation symbols as the source Src1 to the destination Dest1, the vector of complex modulation symbols transferred by the relay RL is processed by the pre-coding matrix $A_R$ which is determined so as to cancel or limit the effect of interference between the different flows of vectors of complex modulation symbols transmitted by the sources Src1 to Src3.

Destinations Dest2 and Dest3 are no more interfered by the flow FLS1 of vectors of complex modulation symbols. As no signal relative to sources Src2 and Src3 is sent by the relay RL, their interference on the signal of other sources cannot be decreased or neutralized.

The source Src2 transmits the flow FLS2 of vectors of complex modulation symbols to the destination Dest2. The flow FLS2 of vectors of complex modulation symbols generates interferences $I_{21P2}$ at destination Dest1 and generates interferences $I_{23P2}$ at destination Dest3.

The source Src3 transmits the flow FLS3 of vectors of complex modulation symbols to the destination Dest3. The flow FLS3 of vectors of complex modulation symbols generates interferences $I_{31P2}$ at destination Dest1 and generates interferences $I_{32P2}$ at destination Dest2.

Figure 6C:
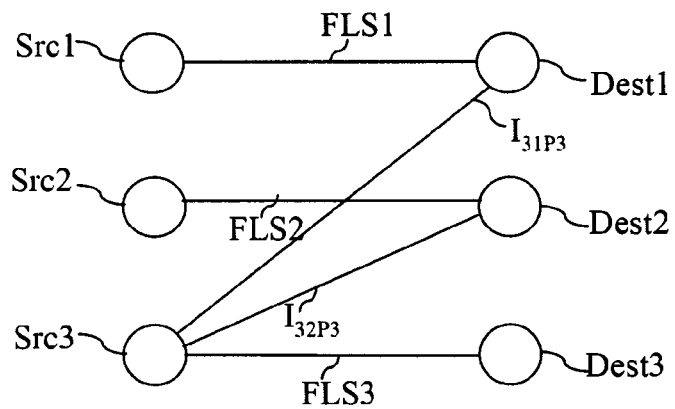

The diagram in FIG. 6c represents the interferences received by the destinations Dest during phase PH3.

The source Src1 transmits the flow FLS1 of vectors of complex modulation symbols to the destination Dest1. The relay RL transfers the same vector of complex modulation symbols as the source Src1 to the destination, the vector of complex modulation symbols transferred by the relay RL is pre-coded by the pre-coding matrix $A_R$ which is determined so as to cancel or limit the effect of interference.

The source Src2 transmits the flow FLS2 of vectors of complex modulation symbols to the destination Dest2. The relay RL transfers the same vector of complex modulation symbols as Src2 to the destination, the vector of complex modulation symbols transferred by the relay RL is pre-coded by the pre-coding matrix $A_R$ which is determined so as to cancel or limit the effect of interference.

Destination Dest1 is no more interfered by the flow FLS2 of vectors of complex modulation symbols.

Destination Dest2 is no more interfered by the flow FLS1 of vectors of complex modulation symbols.

Destination Dest3 is no more interfered by the flows FLS1 and FLS2 of vectors of complex modulation symbols.

The source Src3 transmits the flow FLS3 of vectors of complex modulation symbols to the destination Dest3. The flow FLS3 of vectors of complex modulation symbols generates interferences $I_{31P3}$ at destination Dest1 and generates interferences $I_{32P3}$ at destination Dest2.

Figure 6D:
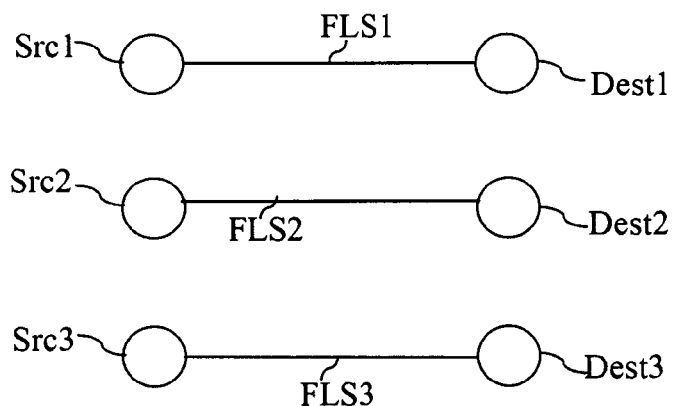

The diagram in FIG. 6d represents the interferences received by the destinations Dest during phase PH4.

The source Src1 transmits the flow FLS1 of vectors of complex modulation symbols to the destination Dest1. The relay RL transfers the same vector of complex modulation symbols as the source Src1 to the destination, the vector of complex modulation symbols transferred by the relay RL is pre-coded by the pre-coding matrix $A_R$ which is determined so as to cancel or limit the effect of interference.

The source Src2 transmits the flow FLS2 of vectors of complex modulation symbols to the destination Dest2. The relay RL transfers the same vector of complex modulation symbols as Src2 to the destination, the vector of complex modulation symbols transferred by the relay RL is pre-coded by the pre-coding matrix $A_R$ which is determined so as to cancel or limit the effect of interference.

The source Src3 transmits the flow FLS3 of vectors of complex modulation symbols to the destination Dest3. The relay RL transfers the same vector of complex modulation symbols as the source Src3 to the destination, the vector of complex modulation symbols transferred by the relay RL is pre-coded by the pre-coding matrix $A_R$ which is determined so as to cancel or limit the effect of interference.

Destination Dest1 is no more interfered by the flows FLS2 and FLS3 of vectors of complex modulation symbols.

Destination Dest2 is no more interfered by the flows FLS1 and FLS3 of vectors of complex modulation symbols.

Destination Dest3 is no more interfered by the flows FLS1 and FLS2 of vectors of complex modulation symbols.

According to a second mode of realisation of the present invention, the relay RL, once it has successfully retrieved an information word, executes a patching on symbols it has to transfer.

The patching technique is a combination of two steps.

The first step is executed at the relay RL by transferring a combination of symbols already sent in previous phases and symbols that the sources are going to send in the current phase.

The second step is executed at the destination Dest by combining signals or soft bits received during these different time slots in order to build an equivalent transmission of a higher modulation.

From a first simplified approach, let us consider that all the sources Src use the same modulation scheme. Let $m_{k,t}$ define the number of bits carried by a QAM symbol during the t-th time slot of the k-th phase PHk. Let $X_{i,k,t}$ be the symbol sent by the i-th source Srci during the t-th time slot of the k-th phase PHk.

Let $Y_{j,k,t}$ be the signal received by the j-th destination Destj during the t-th time slot of the k-th phase PHk.

In order to simplify the principle of the algorithm which will be disclosed hereinafter, we first consider that all the phase durations are equal. The generalization to unequal phase lengths will be done later on.

The channel between the sources Src and the destination Destj is denoted $h_{SDj}$. The channel between the relay RL antennas and the destination Destj is denoted $h_{RDj}$. The destination Destj receives during the t-th time slot of the k+1-th phase PHk+1:

$$\forall j, Y_{j,k+1,t} = h_{SDj}[X_{1,k+1,t}, \ldots, X_{N,k+1,t}]^T + h_{RDj}A_R[Z_{1,k+1,t}, \ldots, Z_{k,k+1,t}, 0, \ldots, 0]^T + \eta_{j,k+1,t}$$

After the transmission of the k previous phases PH1 to PHk, we observe the following equivalent channel model, where $\hat{X}_{i,t}^{(k)}$ are the equivalent vectors of complex modulation symbols as appeared to be sent by the i-th source Srci, the k−1 first vectors of complex modulation symbols being also sent by the relay RL.

The equivalent channel model is the channel observed at the destination Dest after applying the patching technique.

The destination Destj receives during the t-th time slot the equivalent received symbol:

$$\forall j, \hat{Y}_{j,t}^{(k)} = h_{SDj}[\hat{X}_{1,t}^{(k)}, \ldots, \hat{X}_{N,t}^{(k)}]^T + h_{RDj}A_R[\hat{X}_{1,t}^{(k)}, \ldots, \hat{X}_{k-1,t}^{(k)}, 0, \ldots, 0]^T + \eta_{j,k,t}$$

Where $\eta_{j,k,t}$ is the noise observed on the equivalent channel.

Equivalently, the equivalent channel model is written:

$$\forall j, \hat{Y}_{j,t}^{(k)} = (h_{SDj} + h_{RDj}A_R)[\hat{X}_{1,t}^{(k)}, \ldots, \hat{X}_{k-1,t}^{(k)}, 0, \ldots, 0]^T + h_{SDj}[0, \ldots, 0, \hat{X}_{k,t}^{(k)}, \ldots, \hat{X}_{N,t}^{(k)}]^T + \eta_{j,k,t}$$

We observe that by having an the interference neutralization at the relay RL, the sources Src1 to Srck−1 do not interfere on the others.

The destination Destj then combines the received signal and the equivalent received signal:

$$\forall j, a_{k+1,t}\hat{Y}_{j,t}^{(k)} + b_{k+1,t}Y_{j,k+1,t} = \eta''_{j,k+1,t}$$

$$+ h_{SDj}[a_{k+1,t}\hat{X}_{1,t}^{(k)} + b_{k+1,t}X_{1,k+1,t}, \ldots, a_{k+1,t}\hat{X}_{N,t}^{(k)} + b_{k+1,t}X_{N,k+1,t}]^T$$

$$+ h_{RDj}A_R[a_{k+1,t}\hat{X}_{1,t}^{(k)} + b_{k+1,t}Z_{1,k+1,t}, \ldots, a_{k+1,t}\hat{X}_{k-1,t}^{(k)} + b_{k+1,t}Z_{k-1,k+1,t}, \ldots, b_{k+1,t}Z_{k,k+1,t}, 0, \ldots, 0]^T$$

where $\eta''_{j,k+1,t}$ is the noise observed on the equivalent channel.

The vectors of complex modulation symbols Z sent by the relay RL are chosen so that:

$$\forall 0 < i < k, \forall t, Z_{i,k+1,t} = X_{i,k+1,t} \text{ and } Z_{k,k+1,t} = X_{k,k+1,t} + \frac{a_{k+1,t}}{b_{k+1,t}}\hat{X}_{k,t}^{(k)}$$

After patching, the equivalent complex modulation symbol is updated to:

$$\forall 0 < i \leq N, \forall t, \hat{X}_{i,t}^{(k+1)} = a_{k+1,t}\hat{X}_{i,t}^{(k)} + b_{k+1,t}X_{i,k+1,t}$$

and the equivalent received symbol are:

$$\forall j, \forall t, \hat{Y}_{j,t}^{(k+1)} = \eta''_{j,k+1,t} + (h_{SDj} + h_{RDj}A_R)[\hat{X}_{1,t}^{(k+1)}, \ldots, \hat{X}_{k,t}^{(k+1)}, 0, \ldots 0]^T + h_{SDj}[0, \ldots, 0, \hat{X}_{k+1,t}^{(k+1)}, \ldots, \hat{X}_{N,t}^{(k+1)}]^T$$

Thus, the k+1-th equivalent channel model at the end of the k+1-th phase satisfies the definition of the equivalent channel model at the end of the k-th phase, and, by induction, we can show that we always come back to such an equivalent channel, whatever the phase.

Thus, by combining the patching technique and the interference neutralization technique with the pre-coding matrix $A_R$, the interference of any of the flows of vectors of complex modulation symbols on the other flows of vectors of complex modulation symbols is reduced, even for previous phases where the interference were not originally neutralized by the relay RL transmission.

The coefficients $a_{k+1,t}$ and $b_{k+1,t}$ can be chosen such that $b_{k+1,t}X_{k,k+1,t} + a_{k+1,t}\hat{X}_{k,t}^{(k)}$ belong to a QAM (Quadrature amplitude modulation), which involves that the vectors $\hat{X}_{i,t}^{(k+1)}$ of complex modulation symbols also always belong to a QAM modulation.

Thus, the decoding step at the destinations is simplified.

FIG. 7 discloses an example of an algorithm executed by the relay according to a second mode of realisation of the present invention.

From a general point of view, during the first phase PH1 of $L_1$ time slots, the relay RL does not transfer any symbol and the destinations Dest observe interference from all the sources. At the end of the first phase PH1, the relay RL succeeds in decoding the information word from which the flow of vectors of complex modulation symbols transferred by the source Src1 are derived. The parameters used during the execution of the present algorithm are initialized as follows for all i.

$\hat{L}_i^{(1)} \leftarrow L_1$, where $\hat{L}_i^{(k)}$ is the length of the interference channel of the i-th source Srci in the k-th equivalent channel, i.e., it is the number of complex modulation symbols of the i-th source that have not been relayed by the relay RL yet, and for which the interference neutralization scheme was not applied. They are the complex modulation symbols of the source Srci that are still interfering on the other sources.

$\forall 0 < t \leq L_1 \hat{m}_t^{(1)} \leftarrow m_{1,t}$ where $\hat{m}_t^{(1)}$ is the number of bits carried by complex modulation symbols $\hat{X}_{i,t}^{(1)}$. $m_{k,t}$ is the number of bits carried by the modulations symbols $X_{i,k,t}$; $\forall 0 < t \leq L_1 \hat{X}_{i,t}^{(1)} \leftarrow X_{i,1,t}$; and $$\forall 0 < t \leq L_1, \forall j \hat{Y}_{j,t}^{(1)} \leftarrow Y_{j,1,t}$$

During the k+1-th phase of $L_{k+1}$ time slots, the relay RL gives a vector $[Z_{1,k+1,t}, \ldots, Z_{k,k+1,t}, 0, \ldots, 0]^T$ at the input of the pre-coding matrix $A_R$ as disclosed in the FIG. 3, where, for all 0<i<k+1, the relay RL executes the following steps:

The first $\min(\hat{L}_i^{(k)}, L_{k+1})$ complex modulation symbols of previous phase PHk which have not been combined yet, are combined with the first complex modulation symbol transmitted by the source Srci during phase PHk+1 in order to form a combined complex modulation symbol, i.e.:

$$\forall 0 < t \leq \min(\hat{L}_i^{(k)}, L_{k+1}) \; Z_{i,k+1,t} = \hat{X}_{i,t}^{(k)} + \frac{b_{k+1,t}}{a_{k+1,t}}X_{i,k+1,t},$$

where $a_{k+1,t}$ and $b_{k+1,t}$ are chosen such that $\forall i, Z_{i,k+1,t}$ belongs to a $$2^{\hat{m}_t^{(k)} + m_{k+1,t}}$$

-QAM (Quadrature Amplitude Modulation).

Two different cases may occur:

The first case is if $L_{k+1} > \hat{L}_k^{(k)}$, the k+1-th equivalent channel is composed of $\hat{L}_k^{(k)}$ time slots where the received complex modulation symbols of the first $\hat{L}_k^{(k)}$ time slots of the k-th equivalent channel at the destination Dest and k+1-th phase PHk+1 are patched and of $L_{k+1} - \hat{L}_k^{(k)}$ time slots of complex modulation symbols that are all relayed using interference neutralization without patching. Thus:

$\forall 1 \leq t \leq \hat{L}_k^{(k)}$, we have:

$$\forall j, \hat{Y}_{j,t}^{(k+1)} = a_{k+1,t}\hat{Y}_{j,t}^{(k)} + b_{k+1,t}Y_{j,k+1,t}$$

$$\forall 1 \leq i \leq N, \hat{X}_{i,t}^{(k+1)} = a_{k+1,t}\hat{X}_{i,t}^{(k)} + b_{k+1,t}X_{i,k+1,t}$$

$$\forall 1 \leq i \leq N, \hat{m}_t^{(k+1)} = \hat{m}_t^{(k)} + m_{k+1,t}$$

$$\forall \hat{L}_k^{(k)} < t \leq L_{k+1},$$

$\forall j, \hat{Y}_{j,t}^{(k+1)} = Y_{j,k+1,t}$ $\forall 1 \le i \le N, \hat{X}_{i,t}^{(k+1)} = X_{i,k+1,t}$ $\forall 1 \le i \le N, \hat{m}_t^{(k+1)} = m_{k+1,t}$ $\forall 1 \le i \le k, \hat{L}_i^{(k+1)} = 0$ and $\forall k+1 \le i \le N, \hat{L}_i^{(k+1)} = L_{k+1}$.

The second case is if $L_{k+1} \le \hat{L}_k^{(k)}$ the k+1-th equivalent channel is composed of $\hat{L}_k^{(k)} - L_{k+1}$ time slots of complex modulation symbols that are not already relayed and put at the beginning of the k+1-th equivalent channel in order for them to be relayed with the highest priority in the next phases, and of $L_{k+1}$ time slots where the received complex modulation symbols of the first $L_{k+1}$ time slots of the k-th equivalent channel and k+1-th phase are patched.

Thus:

$\forall 1 \le t \le \hat{L}_k^{(k)} - L_{k+1}$, we have:

$\forall j, \hat{Y}_{j,t}^{(k+1)} = \hat{Y}_{j,t+L_{k+1}}^{(k)}$ $\forall 1 \le i \le N, \hat{X}_{i,t}^{(k+1)} = \hat{X}_{j,t+L_{k+1}}^{(k)}$ $\forall 1 \le i \le N, \hat{m}_t^{(k+1)} = \hat{m}_{t+L_{k+1}}^{(k)}$ $\forall 1 \le t \le L_{k+1}$, we have:

$\forall j, \hat{Y}_{j,t+\hat{L}_k^{(k)}-L_{k+1}}^{(k+1)} = a_{k+1,t}\hat{Y}_{j,t}^{(k)} + b_{k+1,t}Y_{j,k+1,t}$ $\forall 1 \le i \le N, \hat{X}_{i,t+\hat{L}_k^{(k)}-L_{k+1}}^{(k+1)} = a_{k+1,t}\hat{X}_{i,t}^{(k)} + b_{k+1,t}X_{i,k+1,t}$ $\forall 1 \le i \le N, \hat{m}_{t+\hat{L}_k^{(k)}-L_{k+1}}^{(k+1)} = \hat{m}_t^{(k)} + m_{k+1,t}$ $\forall 1 \le i \le k, \hat{L}_i^{(k+1)} = \max(\hat{L}_i^{(k)} - L_{k+1}, 0)$ defines the new interference phase length for the i-th source (the number of symbol still not relayed) and $\forall k+1 \le i \le N, \hat{L}_i^{(k+1)} = \hat{L}_i^{(k)} = \hat{L}_k^{(k)}$ At each iteration, the relay RL computes the $[Z_{1,k+1,t}, \ldots, Z_{k,k+1,t}, 0, \ldots 0]^T$ and updates the $\hat{m}_t^{(k)}$, $\hat{X}_{i,t}^{(k)}$, and $\hat{L}_i^{(k+1)}$ values. The destination computes and store the $\hat{m}_t^{(k)}$, $\hat{Y}_{j,t}^{(k)}$, $\hat{L}_t^{(k+1)}$, and the decoding is processed on the equivalent channel, i.e. from the equivalent received symbols $\hat{Y}_{j,t}^{(k)}$.

The algorithm of FIG. 7 is executed by the relay RL in parallel for each flow of vectors of complex modulation symbols.

More precisely, the present algorithm is executed by the processor 200 of the relay RL.

At step S700, the processor 200 detects the reception of a complex modulation symbol through the wireless interface 205. The complex modulation symbol belongs to the flow of vectors of complex modulation symbols for which the present algorithm is executed.

The complex modulation symbol is received by the downlink receiver 210 or the uplink receiver 212 and is concatenated to the vectors of complex modulation symbols which have been previously received from the beginning of the transmission of one information word.

At next step S701, the processor 200 commands the wireless interface 205 to decode at least one received vector of complex modulation symbols.

The at least one received vector of complex modulation symbols includes the last received complex modulation symbols and may include at least one vector of complex modulation symbols previously received by the relay RL.

The at least one vector of complex modulation symbols is demodulated, de-interleaved and decoded into soft estimates of information bits and redundancy.

At next step S702, the processor 200 checks if the cyclic redundancy check of at least one information word from which complex modulation symbols of the at least one received vector of complex modulation symbols is correct.

If the CRC is correct, the processor 200 moves to step S703, otherwise, the processor 200 returns to step S700.

It has to be noted here that in a variant, if the CRC is correct, the processor 200 further checks if an acknowledgment message has been transferred by the destination Dest to the source Src for the last received vector of complex modulation symbols.

If an acknowledgment message has been transferred, the processor 200 moves to step S715, otherwise, the processor 200 returns to step S700.

Once the CRC is correct, the processor 200 knows the K information bits transmitted by the source Src and is able to generate complex modulation symbols in the same way as the source Src, thanks to a rate matching algorithm.

The processor 200 is able to generate complex modulation symbols previously transmitted by the source Src1 during phase PH1 and to generate complex modulation symbols that will be transmitted by the source Src1 during phase PH2.

Once a CRC is correct, the relay RL moves from the phase PH1 to the next phase, i.e. the phase PH2.

FIG. 8 represents the flow of vectors of complex modulation symbols transferred by the sources and the relay during phases PH1 and PH2.

In the example of FIG. 8, N equals three sources Src that are transmitting N flows of vectors of complex modulation symbols.

In the first phase PH1, the relay RL receives vectors 811 of complex modulation symbols of the flow FLS1 of vectors of complex modulation symbols. The relay RL receives vectors 812 of complex modulation symbols of the flow FLS2 of vectors of complex modulation symbols and the relay RL receives vectors 813 of complex modulation symbols of the flow FLS3 of vectors of complex modulation symbols.

For example, the vectors 811, 812 and 813 of complex modulation symbols are modulated using a Quadrature Phase Shift Keying (QPSK) modulation scheme.

At the end of phase PH1, the processor 200 successfully retrieves information word from which one of the vectors 811 of complex modulation symbols are derived and does not successfully retrieve the information words from which the vectors of complex modulation symbols 812 and 813 are retrieved.

For the flow FLS1 of vectors of complex modulation symbols, the processor 200 moves from step S702 to S703.

For the flows FLS2 and FLS3 of vectors of complex modulation symbols, the processor 200 returns from step S702 to S700.

At step S703, the processor 200 initializes the following parameters:

$\hat{L}_i^{(1)} \leftarrow L_1$, $\forall 0 < t \le L_1 \, \hat{m}_t^{(1)} \leftarrow m_{1,t}$ $\forall 0 < t \le L_1 \, \hat{X}_{i,t}^{(1)} \leftarrow X_{i,1,t}$ $\forall 0 < t \le L_1, \forall j \, \hat{Y}_{j,t}^{(1)} \leftarrow Y_{j,1,t}$.

At next step S704, the processor 200 checks if at least one complex equivalent modulation symbol derived from the information word from which the complex modulation symbols of the flow of complex modulation symbols transmitted by the source Srci are derived has not been relayed yet, i.e., whose interference on other source signals has not been neutralized.

A complex equivalent modulation symbol is said to be not relayed yet if it has not been previously combined with a complex modulation symbols of a vector of complex modulation symbols transmitted by the source Srci in the current phase, or if it has not been transferred directly by the relay RL without combination.

If at least one complex equivalent modulation symbol associated to the source Srci has not been relayed yet, the processor 200 moves to step S705. Otherwise, the processor 200 moves to step S710.

At step S705, the processor 200 obtains a complex equivalent modulation symbols $\hat{X}_{i,t}^{(k)}$ associated to the source Src.

At next step S706, the processor 200 obtains a complex modulation symbols $X_{i,k+1,t}$ which will be transmitted by the source Src during phase PH2.

At next step S707, the processor 200 combines the complex modulation symbols obtained at steps S705 and S706 into a combined modulation symbol using the following formula:

$$Z_{i,k+1,t} = \hat{X}_{i,t}^{(k)} + \frac{b_{k+1,t}}{a_{k+1,t}} X_{i,k+1,t}$$

At next step S708, the processor 200 commands the transfer of the combined complex modulation symbol at a $$2^{\hat{m}_t^{(k)} + m_{k+1,t}}$$

-QAM i.e. at 16QAM.

At next step S709, the processor 200 checks if a CRC event occurs. A CRC event occurs when a CRC of an information word from which another flow of vector of complex modulation symbols is derived from is successfully retrieved, for example a CRC of the information word from which the flow of complex modulation symbols transmitted by the source Src2 is derived is correct.

If a CRC event occurs, the processor 200 leaves the phase PH2 and moves to step S713. Otherwise, the processor 200 returns to step S704, i.e. stays in phase PH2.

As far as a no CRC event occurs and as far as at least one complex modulation symbols previously transmitted by the source Src has not been transferred or combined by the relay RL, the processor 200 obtains other complex modulation symbols previously transmitted by the source Src, obtains others complex modulation symbols $X_{i,k+1,t}$ which will be transmitted by the source Src during phase PH2, combines the complex modulation symbols and commands the transfer of the combined vector of complex modulation symbols at a $2^{\hat{m}_t^{(k)} + m_{k,1,t}}$-QAM.

In the second phase PH2 of FIG. 8, the relay RL receives vectors 821 of complex modulation symbols of the flow FLS1 of vectors of complex modulation symbols, the relay RL receives vectors 822 of complex modulation symbols of the flow FLS2 of vectors of complex modulation symbols and the relay RL receives vectors 823 of complex modulation symbols of the flow FLS3 of vectors of complex modulation symbols.

For example, the vectors 821, 822 and 823 of complex modulation symbols are modulated using a Quadrature Phase Shift Keying (QPSK) modulation scheme.

The vectors of combined complex modulation symbols 850 are transferred by the relay RL during phase PH2 of $L_2$ time slots. The vectors of combined complex modulation symbols 850 are the combination of the first $L_2$ symbols of 811 and of the first $L_2$ symbols of 821.

At the end of phase PH2, the processor 200 decodes complex modulation symbols and successfully retrieves the information word from which the complex modulation symbol of the flow of complex modulation symbols transmitted by the source Src2 is derived.

At step S713, the processor 200 checks if at least one complex equivalent modulation symbols associated to the source Srci has not been relayed yet.

If at least one complex modulation symbol associated to the source Srci in the previous phase has not been relayed yet, the processor 200 moves to step S713. Otherwise, the processor 200 moves to step S714.

As shown in FIG. 8, the duration of the second phase PH2 is smaller than the duration of the first phase PH1. It means that at least one complex modulation symbol transmitted by the source Src1 in the previous phase has not been combined with a complex modulation symbol transmitted by the source Src1 in the current phase PH2.

At step S714, the processor 200 reorders the at least one vector of complex modulation symbols transmitted by the source Srci in the previous phase that has not been relayed yet so as to put the non-relayed symbols at the beginning of the new equivalent channel model. Thus, patching can be easily applied in priority on these symbols in the next phase, and interference neutralization applied on these symbols while it was impossible to limit their interference when they were first sent by the source. After that, the processor 200 moves to step S715.

FIG. 9 represents the equivalent channel at destination during the phase PH2.

The $L_1$-$L_2$ first symbols of Src1 in the new equivalent channel EQV2 are still interfering on the other sources Src2 and Src3.

At the destinations Dest, the reception patching technique is performed, by summing the vectors of complex modulation symbols received during the $L_2$ first time slots of the first phase and the vectors of complex modulation symbols received during the $L_2$ first time slots of the second phase, which allows for rebuilding the 16QAM vectors of complex modulation symbols as if they were sent originally by the source Src1.

Since the $L_2$ 16-QAM vectors of complex modulation symbols 94 are sent on the same resource by the source Src1 and the relay RL, and since the pre-coder $A_R$ allows for interference neutralization, the interference from the source Src1 to the other sources is limited at the destinations.

Furthermore, after the patching at the destinations Dest, the vectors of complex modulation symbols 95 and 96 of the phases PH1 and PH2 sent by sources Src2 and Src3 form 16-QAM symbols still interfering on the other sources signals.

Vectors of complex modulation symbols noted 90 are the non-relayed symbols put at the beginning of the new equivalent channel model PH2. The vectors of complex modulation symbols 90 in the new equivalent channel are still interfering on the flows of complex modulation symbols transmitted by the sources Src2 and Src3.

Vectors of complex modulation symbols noted 91 are transmitted by the source Src2 and vectors of complex modulation symbols noted 92 are transmitted by the source Src3 at the beginning of the new equivalent channel model PH2.

The vectors of complex modulation symbols 90, 91 and 92 form QPSK symbols still interfere on flows of complex modulation symbols transmitted by the sources Src2 and Src3.

At step S715, the processor 200 checks if the transmission of vectors of complex modulation symbols ends or if an acknowledgement is sent from the destination Dest to the source Src.

The transmission of complex modulation symbols ends when the destination Dest acknowledges one information word from which at least one vector of complex modulation symbols is derived or when no acknowledgment is received within a given time period or in case of broadcasting, when all vectors of complex modulation symbols are transferred.

If the transmission of vectors of complex modulation symbols ends, the processor 200 returns to step S700. Otherwise, the processor 200 moves to step S716.

At step S716, the processor 200 updates, according to the example of FIG. 8, the following parameters:

if $L_{k+1} > \hat{L}_k^{(k)}$ $\forall 1 \le t \le \hat{L}_k^{(k)}$:

$\forall j, \hat{Y}_{j,t}^{(k+1)} = a_{k+1,t} \hat{Y}_{j,t}^{(k)} + b_{k+1,t} Y_{j,k+1,t}$ $\forall 1 \le i \le N, \hat{X}_{i,t}^{(k+1)} = a_{k+1,t} \hat{X}_{i,t}^{(k)} + b_{k+1,t} X_{i,k+1,t}$ $\forall 1 \le i \le N, \hat{m}_t^{(k+1)} = \hat{m}_t^{(k)} + m_{k+1,t}$ $\forall \hat{L}_k^{(k)} < t \le L_{k+1}$, $\forall j, \hat{Y}_{j,t}^{(k+1)} = Y_{j,k+1,t}$ $\forall 1 \le i \le N, \hat{X}_{i,t}^{(k+1)} = X_{i,k+1,t}$ $\forall 1 \le i \le N, \hat{m}_t^{(k+1)} = m_{k+1,t}$ $\forall 1 \le i \le k, \hat{L}_i^{(k+1)} = 0$ and $\forall k+1 \le i \le N, \hat{L}_i^{(k+1)} = L_{k+1}$.

if $L_{k+1} \le \hat{L}_k^{(k)}$ $\forall 1 \le t \le \hat{L}_k^{(k)} - L_{k+1}$:

$\forall j, \hat{Y}_{j,t}^{(k+1)} = \hat{Y}_{j,t+L_{k+1}}^{(k)}$ $\forall 1 \le i \le N, \hat{X}_{i,t}^{(k+1)} = \hat{X}_{i,t+L_{k+1}}^{(k)}$ $\forall 1 \le i \le N, \hat{m}_t^{(k+1)} = \hat{m}_{t+L_{k+1}}^{(k)}$ $\forall 1 \le t \le L_{k+1}$:

$\forall j, \hat{Y}_{j,t+\hat{L}_k^{(k)}-L_{k+1}}^{(k+1)} = a_{k+1,t} \hat{Y}_{j,t}^{(k)} + b_{k+1,t} Y_{j,k+1,t}$ $\forall 1 \le i \le N, \hat{X}_{i,t+\hat{L}_k^{(k)}-L_{k+1}}^{(k+1)} = a_{k+1,t} \hat{X}_{i,t}^{(k)} + b_{k+1,t} X_{i,k+1,t}$ $\forall 1 \le i \le N, \hat{m}_{t+\hat{L}_k^{(k)}-L_{k+1}}^{(k+1)} = \hat{m}_t^{(k)} + m_{k+1,t}$ $\forall 1 \le i \le k, \hat{L}_i^{(k+1)} = \max(\hat{L}_i^{(k)} - L_{k+1}, 0)$ and $\forall k+1 \le i \le N, \hat{L}_i^{(n+1)} = \hat{L}_i^{(k)} = \hat{L}_k^{(k)}$ After that, the processor 200 moves to step S704 already described and phase PH3 starts.

FIG. 10 represents the equivalent channel at destination during the phase PH2 and the flow of vectors of complex modulation symbols transmitted by the sources and the relay during phases PH3.

The vectors 101, 102, 1010, 1011, 103, 106 and 1020 of complex modulation symbols are transmitted by the sources Src1, Src2 and Src3 using a QPSK modulation.

In the equivalent channel EQV2 of size $L_1$, the vectors 90 and 91 of complex modulation symbols transmitted by the source Src1 and Src2 in the previous phases have not been relayed yet.

The relay RL retrieves the vector 90 of complex modulation symbols transmitted by the source Src1, combines them with vector 101 of complex modulation symbols to be transmitted by the source Src1 during phase PH3 and transfers the combined vectors 104 using a 16-QAM modulation.

The relay RL retrieves the vector 91 of complex modulation symbols transmitted by the source Src2, combines them with vector 102 of complex modulation symbols to be transmitted by the source Src2 during phase PH3 and transfers the combined vectors 105 of complex modulation symbols using a 16-QAM modulation In the equivalent channel EQV2, the vectors 94 of 16-QAM complex modulation symbols transmitted by the source Src1 in the previous phase PH1 have already been relayed and their interference on other flows of complex modulation symbols transmitted by the sources is limited.

The relay RL commands the transfer of the vector 1012 of complex modulation symbols pre-coded by the pre-coding matrix $A_R$. The vector of complex modulation symbols 1012 is identical to the vector 1010 of complex modulation symbol transmitted by the source Src1. The vector of complex modulation symbols 1012 is transferred by the relay RL using a QPSK modulation. Both vectors 1010 and 1012 of complex modulation symbols are sent at the same time and their interference on other flows of complex modulation symbols transmitted by the sources is then limited.

During the phase PH3, the vectors 95 of complex modulation symbols transmitted by the source Src2 in the previous phase PH1 have not been relayed by the relay RL.

The relay RL retrieves the vectors 95 of complex modulation symbols transmitted by the source Src2 in the equivalent channel EQV2, combines them with vectors 1011 of complex modulation symbols to be transmitted by the source Src2 at the same time during phase PH3 and transfers the combined vectors 1013 of complex modulation symbols using a 64-QAM modulation.

Once all the vectors 95, 102 and 1011 of complex modulation symbols are relayed, the phase PH3 is not completed.

The processor 200 moves from step S704 to step S710.

At step S710 the processor 200 generates vectors of complex modulation symbols that are to be transmitted by the source Src1 during the last $L_3-L_1$ time slots of phase PH3.

At next step S712, the processor 200 commands the transfer of the vector 108 of complex modulation symbols which is pre-coded by the pre-coding matrix $A_R$ through the wireless interface 205.

The vector 108 of complex modulation symbols is identical to the vector of complex modulation symbols 103 and the vectors 103 and 108 of complex modulation symbols are sent at the same time.

Simultaneously, the processor 200 commands the transfer of the vector 109 of complex modulation symbols which is pre-coded by the pre-coding matrix $A_R$ through the wireless interface 205.

The vector 109 of complex modulation symbols is identical to the vector of complex modulation symbols 106 and the vectors 106 and 109 of complex modulation symbols are sent at the same time.

The relay RL transfers the vectors 108 and 109 of complex modulation symbols using a QPSK modulation.

FIG. 11 represents the equivalent channel at destination during the phase PH3.

The $L_3$ complex modulation symbols of Src3 in the new equivalent channel EQV3 are still interfering on the flows of complex modulation symbols transmitted by the sources Src1 and Src2.

At the destination Destj, the reception patching technique is performed, by summing the vector of complex modulation symbols received during the $L_1$-$L_2$ first time slots of the EQV2 equivalent channel and the vector of complex modulation symbols received during the $L_1$-$L_2$ first time slots of PH3, which allows for rebuilding the 64QAM vectors of complex modulation symbols as if they were originally sent by the sources.

The $L_1$-$L_2$ 64-QAM complex modulation symbols of the flows of complex modulation symbols transmitted by the sources Src1 and Src2 have a limited interference on the flow of complex modulation symbols transmitted by the source Src3, since they have been sent on the same resource by the source Src1 and Src2 and the relay RL, and since the pre-coding matrix $A_R$ allows interference neutralization.

The $L_2$ complex 16-QAM complex modulation symbols 94 have a limited interference on the flows of complex modulation symbols transmitted by the other sources as a result of the previous phases transmission. The $L_2$ QPSK complex modulation symbols 1010 sent by Src1 have a limited interference on the flows of complex modulation symbols transmitted by the other sources as they are also transmitted as 1012 from the relay RL. As a result, in the equivalent channel EQV3, the combination of these $L_2$ received symbols 1110 has a limited interference on the flows of complex modulation symbols transmitted by the other sources.

After patching at the destination Dest2, the 64-QAM complex modulation symbols 1111 transferred by the relay RL during the $L_2$ next time slots are reconstructed and appear to be sent from the relay and the source Src2 at the same time through the interference neutralization process. Thus, during the $L_2$ next time slots, the complex modulation symbols 1111 do not interfere on the complex modulation symbols transmitted by the source Src1 and on the flow FLS3 of complex modulation symbols transmitted by the source Src3.

Finally, during the last $L_3$-$L_1$ time slots, the vectors 1103 and 1106 of complex modulations symbols are transferred by the relay RL as disclosed in reference to the FIG. 4.

The flow of complex modulation symbols 1121, 1120 and 1122 still interfere on the flow of complex modulation symbols 1101, 1110 and 1103.

The flow of complex modulation symbols 1121, 1120 and 1122 still interfere on the flow of complex modulation symbols 1102, 1111 and 1106.

The interference generated by the flow of complex modulation symbols transmitted by the source Src3 to Src1 and Src2 can be completely removed by using the next phases and patching at least $L_3$ new time slots altogether, and forming 128-QAMs.

It has to be noted here that, for complexity or performance reasons, the relay RL can decide to limit the patching to 64-QAM and choose to apply patching only for the first relayed sources.

It has to be noted here that in a variant of realisation of the first and second modes of realisation of the present invention, the relay RL may be a half duplex relay.

In that case, instead of starting transferring complex modulations symbols once one information word is successfully retrieved, the relay RL starts to transfer complex modulations symbols once at least two information words from which at least two different flows of complex modulation symbols are derived are successfully retrieved.

Naturally, many modifications can be made to the embodiments of the invention described above without departing from the scope of the present invention.

The invention claimed is:

1. A method for limiting interference received by a plurality of destinations, the interference being generated by plural flows of complex modulation symbols transferred by a plurality of sources on same resources of a wireless telecommunication network, each source transferring a flow of complex modulation symbols to one destination, wherein a relay for each flow of complex modulation symbols, performs a method comprising:
   receiving complex modulation symbols;
   decoding complex modulation symbols of the flow of complex modulation symbols and successfully retrieving an information word from which the complex modulation symbols are derived;
   generating complex modulation symbols to be transmitted by the source which transmits the flow of complex modulation symbols derived from the information word;
   pre-coding the generated complex modulation symbols to be transmitted by the source which transmits the flow of complex modulation symbols derived from the information word, with a pre-coding matrix, the pre-coding matrix being defined so as to reduce interference generated by the flow of complex modulation symbols on the other flows of complex modulation symbols; and
   transferring the pre-coded complex modulation symbols at the same time as the complex modulation symbols transmitted by the source which transmits the flow of complex modulation symbols derived from the information word,
   wherein prior to pre-code the generated complex modulation symbols that will be transmitted by the source which transmits the flow of complex modulation symbols derived from the information word, and the method further includes:
   checking if at least one complex modulation symbol transmitted by the source prior the successful retrieving of the information word has not been transferred by the relay and if at least one complex modulation symbol transmitted by the source prior to the successful retrieving of the information word has not been transferred by the relay,
   generating complex modulation symbols transmitted by the source prior to the successful retrieving of the information word,
   generating complex modulation symbols to be transmitted by the source which transmits the flow of complex modulation symbols derived from the information word,
   combining the generated complex modulation symbols,
   pre-coding the combined complex modulation symbols with the pre-coding matrix, and
   transferring the pre-coded combined complex modulation symbols at the same time as the complex modulation symbols transmitted by the source which transmits the flow of complex modulation symbols derived from the information word.

2. The method according to claim 1, wherein the pre-coding matrix is determined according to a matrix of channel coefficients between the sources and the destinations and a matrix between the relay and the destinations.

3. The method according to claim 1, further comprising updating the modulation used for transferring the pre-coded combined complex modulation symbols.

4. The method according to claim 3, wherein the generated complex modulation symbols are weighted by coefficients during the combining step and the coefficients are chosen such that combined generated complex modulation symbols belong to a Quadrature amplitude modulation.

5. The method according to claim 1, wherein the relay is a half duplex relay and the relay, prior to generating and transmitting complex modulation symbols, checks if at least two information words from which complex modulation symbols of at least two different flows of complex modulation symbols are successfully retrieved and the complex modulation symbol generation and transfer are executed only if at least two information words from which complex modulation symbols of at least two different flows of complex modulation symbols are successfully retrieved.

6. A device for limiting interference received by a plurality of destinations, the interference being generated by plural flows of complex modulation symbols transferred by a plurality of sources on same resources of a wireless telecommunication network, each source transferring a flow of complex modulation symbols to one destination, the device for limiting interference being included in a relay and comprising, for each flow of complex modulation symbols:

means for receiving complex modulation symbols;
means for decoding complex modulation symbols of the flow of complex modulation symbols and for successfully retrieving an information word from which the complex modulation symbols are derived;
means for generating complex modulation symbols to be transmitted by the source which transmits the flow of complex modulation symbols derived from the information word;
means for pre-coding the generated complex modulation symbols to be transmitted by the source which transmits the flow of complex modulation symbols derived from the information word, with a pre-coding matrix, the pre-coding matrix being defined so as to reduce interference generated by the flow of complex modulation symbols on the other flows of complex modulation symbols; and
means for transferring the pre-coded complex modulation symbols at the same time as the complex modulation symbols transmitted by the source which transmits the flow of complex modulation symbols derived from the information word,
wherein prior to pre-code the generated complex modulation symbols that will be transmitted by the source which transmits the flow of complex modulation symbols derived from the information word:
if at least one complex modulation symbol transmitted by the source prior the successful retrieving of the information word has not been transferred by the relay is determined and if at least one complex modulation symbol transmitted by the source prior to the successful retrieving of the information word has not been transferred by the relay,
complex modulation symbols transmitted by the source prior to the successful retrieving of the information word are generated,
complex modulation symbols to be transmitted by the source which transmits the flow of complex modulation symbols derived from the information word are generated,
the generated complex modulation symbols are combined,
the combined complex modulation symbols are pre-coded with the pre-coding matrix, and
the pre-coded combined complex modulation symbols are transferred at the same time as the complex modulation symbols transmitted by the source which transmits the flow of complex modulation symbols derived from the information word.

7. A method for limiting interference received by a plurality of destinations, the interference being generated by plural flows of complex modulation symbols transferred by a plurality of sources on same resource of a wireless telecommunication network, each source transferring a flow of complex modulation symbols to one destination, the method, for each flow of complex modulation symbols, comprising:

receiving complex modulation symbols;
decoding complex modulation symbols of the flow of complex modulation symbols and successfully retrieving an information word from which the complex modulation symbols are derived;
generating complex modulation symbols to be transmitted by the source which transmits the flow of complex modulation symbols derived from the information word;
pre-coding the generated complex modulation symbols to be transmitted by the source which transmits the flow of complex modulation symbols derived from the information word, with a pre-coding matrix, the pre-coding matrix being defined so as to reduce the interference generated by the flow of complex modulation symbols on the other flows of complex modulation symbols;
transferring, by a relay, the pre-coded complex modulation symbols at the same time as the complex modulation symbols transmitted by the source which transmits the flow of complex modulation symbols derived from the information word; and
receiving, by the destination, the complex modulation symbols from the source and the relay,
wherein prior to pre-code the generated complex modulation symbols that will be transmitted by the source which transmits the flow of complex modulation symbols derived from the information word:
if at least one complex modulation symbol transmitted by the source prior the successful retrieving of the information word has not been transferred by the relay is determined and if at least one complex modulation symbol transmitted by the source prior to the successful retrieving of the information word has not been transferred by the relay,
complex modulation symbols transmitted by the source prior to the successful retrieving of the information word are generated,
complex modulation symbols to be transmitted by the source which transmits the flow of complex modulation symbols derived from the information word are generated,
the generated complex modulation symbols are combined,
the combined complex modulation symbols are pre-coded with the pre-coding matrix, and
the pre-coded combined complex modulation symbols are transferred at the same time as the complex modulation symbols transmitted by the source which transmits the flow of complex modulation symbols derived from the information word.

8. A system for limiting interference received by a plurality of destinations, the interference being generated by plural flows of complex modulation symbols transferred by a plurality of sources on same resources of a wireless telecommunication network, each source transmitting a flow of complex modulation symbols to one destination, the system comprising:

means for receiving complex modulation symbols;
means for decoding complex modulation symbols of the flow of complex modulation symbols and for successfully retrieving an information word from which the complex modulation symbols are derived;
means for generating complex modulation symbols to be transmitted by the source which transmits the flow of complex modulation symbols derived from the information word;
means for pre-coding the generated complex modulation symbols to be transmitted by the source which transmits the flow of complex modulation symbols derived from the information word, with a pre-coding matrix, the pre-coding matrix being defined so as to reduce the interference generated by the flow of complex modulation symbols on the other flows of complex modulation symbols;

means for transferring, by a relay, the pre-coded complex modulation symbols at the same time as the complex modulation symbols transmitted by the source which transmits the flow of complex modulation symbols derived from the information word; and means for receiving at the destination the complex modulation symbols transferred by the source and by the relay, wherein prior to pre-code the generated complex modulation symbols that will be transmitted by the source which transmits the flow of complex modulation symbols derived from the information word:

if at least one complex modulation symbol transmitted by the source prior the successful retrieving of the information word has not been transferred by the relay is determined and if at least one complex modulation symbol transmitted by the source prior to the successful retrieving of the information word has not been transferred by the relay, complex modulation symbols transmitted by the source prior to the successful retrieving of the information word are generated, complex modulation symbols to be transmitted by the source which transmits the flow of complex modulation symbols derived from the information word are generated, the generated complex modulation symbols are combined, the combined complex modulation symbols are pre-coded with the pre-coding matrix, and the pre-coded combined complex modulation symbols are transferred at the same time as the complex modulation symbols transmitted by the source which transmits the flow of complex modulation symbols derived from the information word.

9. A non-transitory computer-readable medium encoded with computer readable instructions that when executed by a programmable device cause the programmable device to execute the method according to claim 1.

* * * * *